(12) United States Patent
De Gaillard

(10) Patent No.: US 6,412,847 B2
(45) Date of Patent: Jul. 2, 2002

(54) MOTOR VEHICLE WITH A DISPLACEABLE CARGO AREA

(75) Inventor: Francois De Gaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/829,398

(22) Filed: Apr. 10, 2001

(30) Foreign Application Priority Data

Apr. 10, 2000 (DE) ................................. 100 17 570

(51) Int. Cl.$^7$ .................................................. B62C 1/06
(52) U.S. Cl. ........................... 296/26.02; 296/26.06; 296/26.11; 296/37.6; 296/100.09
(58) Field of Search ........................... 296/26.02, 37.6, 296/100.09, 26.11, 100.07, 100.06, 100.17, 26.06, 160.02

(56) References Cited

U.S. PATENT DOCUMENTS

| | | | | |
|---|---|---|---|---|
| 1,632,672 A | * | 6/1927 | Obergfell et al. | 296/26.06 |
| 1,766,015 A | * | 6/1930 | Dupre | 296/26.11 |
| 4,522,326 A | * | 6/1985 | Tuohy, III | 296/37.6 |
| 4,580,827 A | * | 4/1986 | Feagan | 296/37.6 |
| 5,169,200 A | * | 12/1992 | Pugh | 296/37.6 |
| 5,464,264 A | * | 11/1995 | Wilson | 296/37.6 |
| 5,605,264 A | * | 2/1997 | Neal | 296/37.6 |
| 5,741,039 A | * | 4/1998 | Habdas | 296/26.11 |
| 5,853,116 A | * | 12/1998 | Schreiner | 296/37.6 |
| 5,899,544 A | * | 5/1999 | James et al. | 296/37.6 |
| 5,992,719 A | * | 11/1999 | Carter, III | 296/37.6 |
| 6,082,804 A | * | 7/2000 | Schlachter | 296/37.6 |
| 6,182,849 B1 | * | 2/2001 | Elstone, Sr. | 206/600 |
| 6,283,525 B1 | * | 9/2001 | Morse | 280/748 |
| 6,325,439 B1 | * | 12/2001 | Crossman | 296/100.09 |
| 2001/0017474 A1 | * | 8/2001 | Leitner et al. | 296/37.6 |

* cited by examiner

*Primary Examiner*—Ken Patel
(74) *Attorney, Agent, or Firm*—Nixon Peabody LLP; David S. Safran

(57) ABSTRACT

A motor vehicle, particularly a pickup truck type vehicle, having a rear-side cargo area which is provided with a separate cargo space module displaceably supported on the vehicle body such that it can be moved between a rear position which adjoins the rear of the cargo area and a forward position near the motor vehicle cab. The cargo space module can be supported to swing by means of a lever arrangement attached to the motor vehicle body. Preferably, the cargo space module has a fixed bottom, a fixed right-side wall, and a fixed left-side wall and is further provided with a front wall, a rear wall, and a cover, each of which is movable from an open to a closed position adjacent the cargo space module.

15 Claims, 3 Drawing Sheets

MOTOR VEHICLE WITH A DISPLACEABLE CARGO AREA

BACKGROUND OF THE INVENTION

1. Field of the Invention

The invention relates to a motor vehicle with a rear-side cargo area which is capable of being shifted from a rearward position to a forward position adjacent the cab of a pickup vehicle or the like.

2. Description of Related Art

Motor vehicles such as pickups or flatbed trucks, or similar transport vehicles, with an open cargo area have a cargo area of a fixed size. Providing a motor vehicle with folding or removable dropsides which border the rear and lateral sides of the cargo area enables a larger cargo to be transported, for example with the rear dropside folded down or removed, the cargo can extend rearwardly out the cargo area. For most such vehicles, the length of the cargo area is correspondingly greater than the driver's cab, which is short in the lengthwise direction of the motor vehicle and usually has only one row of seats. However, when a closed container is necessary for the cargo to be transported, such cargo cannot be accommodated in a small driver's cab. Therefore, the cab must be extended to the rear to hold the cargo or the closed container which has an adverse effect on the available open cargo area. One solution to the problem has been to provide a closed container that is conventionally transported on the cargo area which also diminishes the available open cargo area.

SUMMARY OF THE INVENTION

The object of the invention is to provide a motor vehicle which can be easily adapted to different size cargo requirements and thereby provide greater flexibility for cargo transport. This is achieved by constructing a motor vehicle, as described herein, where a cargo space module is adjustably supported on the vehicle body and can be moved between a rearward position which adjoins the cargo area at the rear of the vehicle and a forward position near the vehicle cab. Then, if necessary, the cargo area can be extended by the cargo space module carried on the motor vehicle such that the possible uses of the vehicle are greatly expanded. In one embodiment of the invention, if additional cargo area is not needed, the cargo space module can be swiveled forward in the direction of the cab, and be situated directly behind the cab on the cargo area. In another embodiment, when the cargo area is provided with dropsides, the cargo space module is located between the dropsides behind the cab. While in a further embodiment, the cargo space module can be settled on the dropsides and can be supported by the vehicle dropsides. In this embodiment, the top of the cargo space module can be designed to be flush with the roof of the cab or be provided with a streamlined design when projecting above the roof of the cab. The cargo space module is preferably constructed as a cube-shaped unit. However, the walls of the cargo space module can deviate from the cube-shape for the purpose of streamlining.

The cargo space module disclosed herein is pivotally supported by means of a lever or swiveling-rod arrangement on the vehicle body; however, other movement mechanisms can also be provided. For example, a simple holder, for use on a small vehicle, can enable a manually movable cargo space module, that is constructed of correspondingly light materials, to be easily shifted between a forward and a rearward position. In a preferred embodiment, the lever arrangement is a right-sided and a left-sided four-bar arrangement with which the cargo space module can be moved in parallel alignment to the vehicle body between the forward and rearward positions.

In one particularly preferred embodiment, the vehicle-side attachment site for the four-bar arrangement is on the right-side or left-side stationary dropsides. However, the four-bar arrangement may also be supported on bearing elements which are attached via a stationary or movable arrangement on the cargo area.

In order to optimize the diverse applications of the cargo space module, it is particularly advantageous to construct the cargo space module with a fixed bottom, right side wall, and left side wall, and construct the cargo space module with a front wall, rear wall, and cover that are movable from a closed position to an open position.

In another embodiment, when it is desired to open the cargo space module, the front wall, the rear wall, and the cover of the cargo space module are supported such that each is capable of being swiveled on the cargo space module out of their respective closed positions into open positions. The module walls remain attached to the cargo space module and are kept ready for use.

In still another embodiment, when the cargo space module is in the forward position, the rear wall of the module is constructed as a two-ply flap. The rearwardly facing outer flap of the two-ply flap is mounted so as to be capable of being folded down onto the dropsides for covering the open cargo area.

In a preferred embodiment, when the cargo space module is positioned in the rearward position the rear wall and the front wall of the cargo space module can be folded down or removed to lengthen the usable cargo area. When the rear wall of the cargo space module is folded down or removed, the cargo can project out of the rear end of the cargo area.

In order to safeguard the back end of the cargo space module, it is a preferred that the rear bumper be supported in an extendable manner on the vehicle body. The rear bumper can then be moved to an extended rear position equal to the length of the cargo space module when the cargo space module has been moved into the rearward position. Preferably, the bumper is movably supported on lengthwise guides on the rear of the motor vehicle beneath the cargo area so as to provide support for the cargo space module.

It is also an embodiment of the invention to provide a drive means for moving the cargo space module such that the cargo space module can be safely moved when loaded.

Embodiments of the motor vehicle in accordance with the invention are explained in detail below with reference to the accompanying drawings.

DETAILED DESCRIPTION OF THE INVENTION

Figure 1:
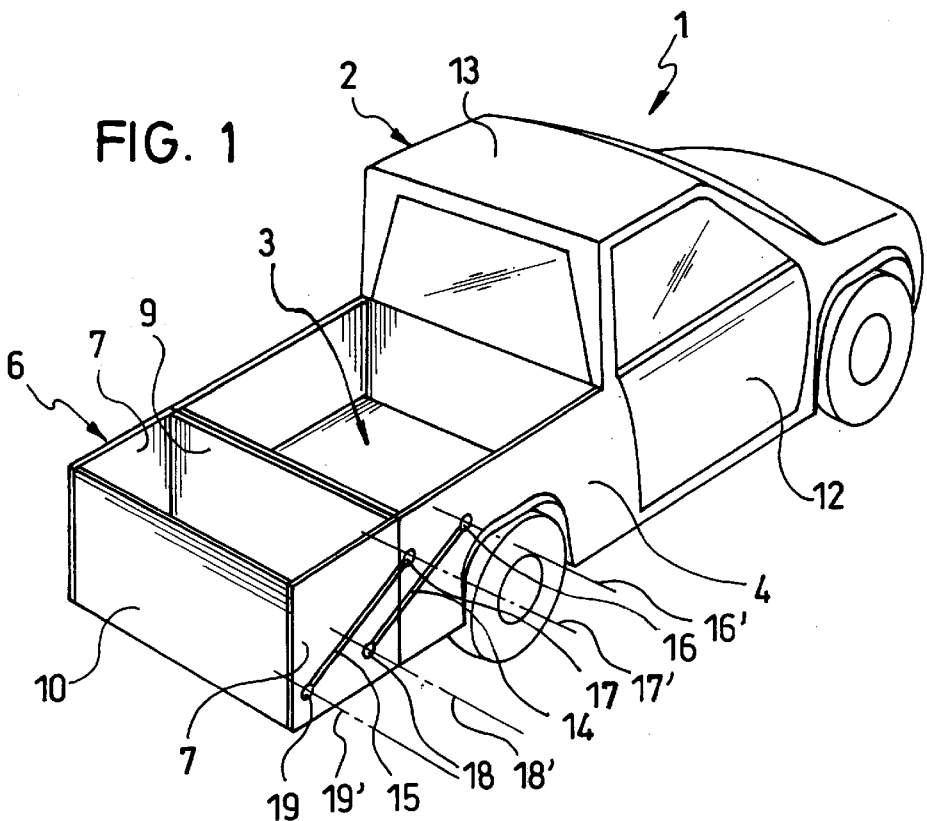
FIG. 1 is a perspective rear view of a motor vehicle with a cargo space module in its rearward position.
Figure 2:
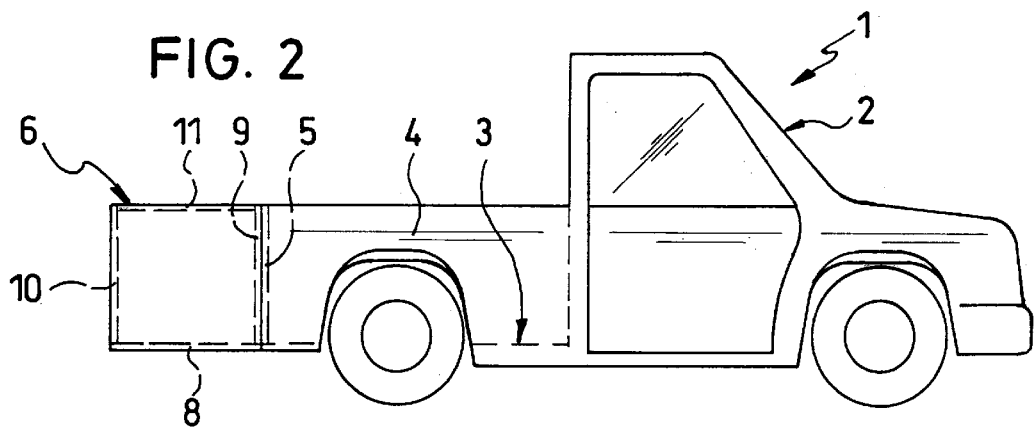
FIG. 2 shows a side view the motor vehicle shown in FIG. 1 with the front wall and the back wall of the cargo space module and the rear dropside of the cargo area erect.
Figure 3:
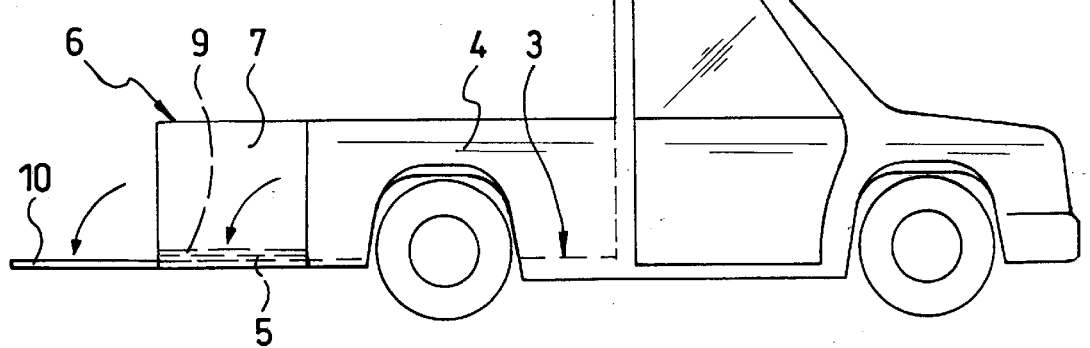
FIG. 3 is a side view as shown in FIG. 2, but with the motor vehicle with the front wall and the back wall of the cargo space module and the rear dropside of the cargo area folded down.

A motor vehicle 1, which can be a transport vehicle or a pickup, contains an open cargo area 3 which is located behind a cab 2 and which is bordered by two opposing lateral dropsides 4 and a rear dropside 5. The rear dropside 5 is attached to the rear edge of the cargo area 3 to be able to swivel on its rear edge and can be swiveled down into the horizontal open position out of its vertical closed position. A cargo space model 6 is attached by a bearing means to the body of the motor vehicle 1 and is located in the rear position, as shown in FIGS. 1 to 3, directly adjoining the rear of the cargo area 3. The cargo space module 6 is a roughly a box-shaped or a cube-shaped unit with two opposite module side walls 7, a module bottom 8, a module front wall 9, a module rear wall 10 and a module cover 11. The width of the cargo space module 6 corresponds approximately to the width of the rear of the vehicle or to the width of the cargo area 3, and the width of the cab 2. This enables the module sides walls 7 to be located, when the module is in either in the forward or rearward position, essentially flush to the lateral dropsides 4 of the cargo area 3, or flush to the doors 12 and the roof 13 of the cab 2.

The movable support means for the cargo space module 6 is composed of two swiveling rods 14 and 15 on each side of the vehicle which are arranged as a four-bar mechanism. The two swiveling rods are coupled in two pivot bearings 16 and 17 on the motor vehicle body and in two pivot bearings 18 and 19 on the cargo space module 16 which enables the module to swivel around the respective transverse axes 16', 17', 18' and 19'. The two pivot bearings 16 and 17 are arranged on the motor vehicle body on the stationary dropside 4 near the top of the cargo area 3 such that the cargo space module 6 can be positioned with a parallel swiveling motion between a rearward position, shown in FIGS. 1 to 3, and a forward position, shown in FIGS. 4 to 6. A schematically shown drive unit 24, FIG. 6, is coupled to at least one of the two swiveling rods 14, 15 in a drive engagement and swivels each into the desired position. The drive unit 24 can comprise a hydraulic piston-cylinder unit positioned on each lateral dropside 4.

Figure 4:
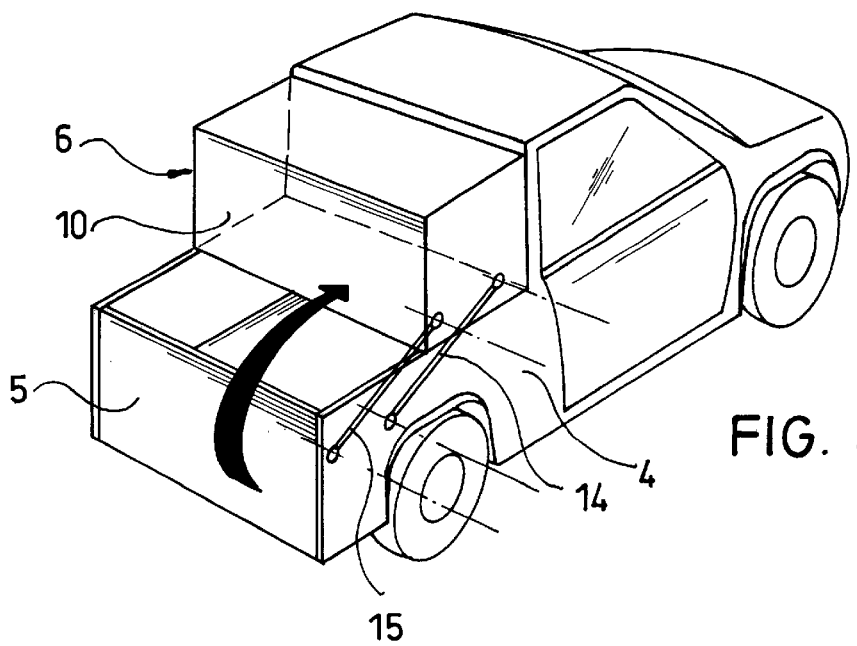
FIG. 4 shows, in a perspective rear view, the motor vehicle with the cargo space module positioned in the forward position adjacent the cab.
Figure 5:
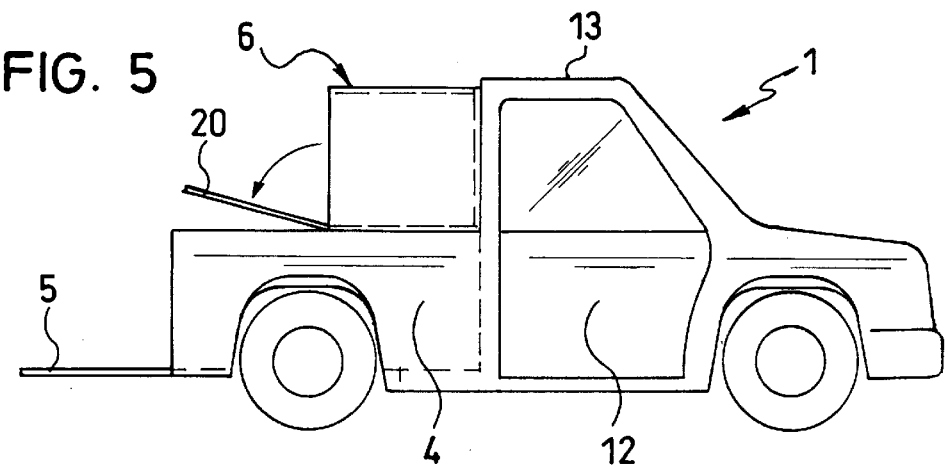
FIG. 5 is a side view as shown in FIG. 2, but the motor vehicle with the cargo space module positioned in the forward position.
Figure 6:
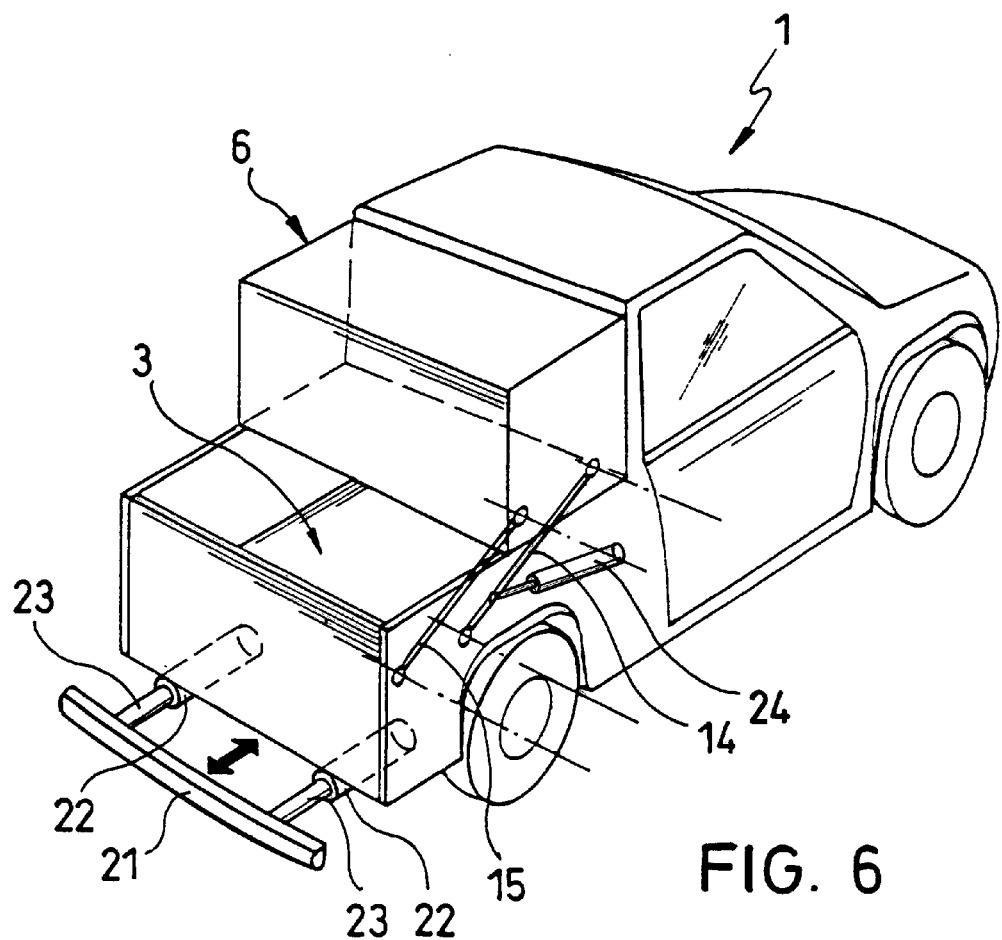
FIG. 6 is a perspective rear view showing the motor vehicle with a extendable rear bumper.

The cargo space module 6 is shown in its forward position, in FIGS. 4 to 6, situated on the lateral dropsides 4 of the cargo area. However, when the lateral dropsides 4 are made to be removed or folded down, there can be provided support elements, such as a support strip mounted on the cab 2 and mounted side supports, to provide support for the weight of the cargo space module 6 when in the forward position.

The rear wall 10 of the module also contains an external rear wall ply 20, shown in FIG. 5, which is pivotally mounted on its rear lower edge to the rear wall 10 of the module so that the rear wall ply 20 can be folded down, when the module is in the forward position, onto the dropsides, as shown in FIG. 5, to cover the open cargo area. In this embodiment, the cargo area 3 is completely covered by the cargo space module 6 and the rear wall ply 20 while at the same time the cargo space module 6 is also closed. The cargo area 3 is accessible by swiveling upward the rear wall ply 20 and swiveling downward the rear dropside 5 to open the cargo area.

In its rear position, shown in FIGS. 1 to 3, the cargo space module 6 directly adjoins the cargo space 3. In this embodiment, the movable elements of the cargo space module 6 can be moved into the corresponding positions for different possible uses. For example, in FIG. 2 the cargo space module 6 is a separated from the cargo area 3 by the front wall 9 of the module and the rear dropside 5 and the module 6 is covered by the removable module cover 11. FIG. 1 shows the cargo space module 6 in the rearward position with the module cover 11 removed. As shown in FIG. 3, the front wall 9 of the module can be folded down to the rear while the rear dropside 5 has already been folded down prior to the cargo space module 6 being moved into its rearward position such that the module 6 rests on the folded down rear dropside 5. Alternatively, the rear dropside 5 is folded onto the folded down front wall 9 of the module or onto the cargo area 3. Thus, the cargo area 3 can be enlarged using by the bottom surface of the cargo space module 6.

Finally, the rear wall 10 of the module can be folded down to the rear, as shown in FIG. 3, so that the continuous cargo area 3 can be extended by an amount equal to the height of the rear wall 10 of the module 6.

Underneath the cargo area 3 is a bumper 21, shown in FIG. 6, which is supported to telescope in and out on a guide means 22 which is supported on the vehicle body or vehicle chassis by bearing rods 23 oriented in the lengthwise direction of the motor vehicle. When the cargo space module 6 is in its rearward position, the bumper can be moved into an extended position in which it extends under the cargo space module 6. The bumper 21, when in this extended position, can form a weight bearing support for the cargo space module 6 so that the bearing means or the swivelling rods 14 and 15 are relieved of some of the weight of the cargo space module 6.

What is claimed is:

1. A motor vehicle having motor vehicle body with a motor vehicle cab and a rear-side cargo area, comprising a separate cargo space module which is displaceably supported on the motor vehicle body such that the cargo space module is movable between a rearward position adjoining a rear end of the rear-side cargo area and a forward position adjacent the motor vehicle cab.

2. A motor vehicle as claimed in claim 1, further comprising means to support and swing the cargo space module between said rearward position adjoining the rear-side cargo area and said forward position adjacent the motor vehicle cab, wherein said support and swivel means comprises a lever arrangement attached to the motor vehicle body.

3. A motor vehicle as claimed in claim 2, wherein the lever arrangement comprises a right-side and a left-side four-bar arrangement for performing a parallel swinging motion of the cargo space module on the motor vehicle body.

4. A motor vehicle as claimed in claim 3, wherein the motor vehicle body comprises right and left dropsides and the four-bar lever arrangements are attached to the right and left dropsides of the motor vehicle.

5. A motor vehicle as claimed in claim 1, wherein the cargo space module is shaped to be flush with the contour of the cab when the cargo space module is positioned in the forward position adjacent to the motor vehicle cab.

6. A motor vehicle as claimed in claim 1, wherein the motor vehicle body comprises two lateral dropsides and the cargo space module when positioned in the forward position is supported above the two lateral dropsides of the cargo area of the motor vehicle.

7. A motor vehicle as claimed in claim 1, wherein the cargo space module is constructed as a cube-shaped unit.

8. A motor vehicle as claimed in claim 1, wherein the cargo space module comprises fixed bottom, right side and left side walls, and is further provided with a front wall, a rear wall and a cover, each of which is movable from a respective closed position closing a respective side of the cargo space module to an open position removed from the respective side of the cargo space module.

9. A motor vehicle as claimed in claim 8, wherein each of the movable front wall, rear wall, and cover of the module are supported to swing on the cargo space module.

10. A motor vehicle as claimed in claim 8, wherein the motor vehicle body further comprises two lateral dropsides and a rear dropside, and the rear wall of the cargo space module comprises a two-ply flap having an outer flap which is foldable down onto the dropsides of the motor vehicle body to cover the cargo area.

11. A motor vehicle as claimed in claim 1, wherein the cargo space module comprises a front wall and the cargo area comprises a rear-side wall, each of which is capable of being folded down or being removed to lengthen the usable cargo area.

12. A motor vehicle as claimed in claim 11, wherein the cargo space module further comprises a rear wall which is capable of being folded down or removed to lengthen the usable cargo area.

13. A motor vehicle as claimed in claim 1, further comprising a rear bumper supported on the motor vehicle body so as to be extendable in rearward direction of the motor vehicle body.

14. A motor vehicle as claimed in claim 13, wherein the rear bumper further comprises lengthwise guides mounted at the rear of the motor vehicle beneath the cargo area, guides providing support for the cargo space module.

15. A motor vehicle as claimed in claim 1, further comprising drive means for moving the cargo space module between said rearward position adjoining the rear-side cargo area and said forward position adjacent the motor vehicle cab.

* * * * *